(12) United States Patent
Weise et al.

(10) Patent No.: US 10,732,423 B2
(45) Date of Patent: Aug. 4, 2020

(54) DEVICE FOR OPTICAL BEAM EXPANSION, OPTICAL SYSTEM, AND METHOD FOR SETTING A SPACING OF TWO LENSES OF A DEVICE FOR OPTICAL BEAM EXPANSION

(71) Applicant: JENOPTIK Optical Systems GmbH, Jena (DE)

(72) Inventors: Juergen Weise, Jena (DE); Birgit Massino, Jena (DE); Joerg Wunderlich, Brahmenau (DE); Tim Baldsiefen, Jena (DE); Jan Werschnik, Jena (DE)

(73) Assignee: JENOPTIK Optical Systems GmbH, Jena (DE)

( * ) Notice: Subject to any disclaimer, the term of this patent is extended or adjusted under 35 U.S.C. 154(b) by 307 days.

(21) Appl. No.: 15/571,399

(22) PCT Filed: Jun. 22, 2016

(86) PCT No.: PCT/EP2016/064345
§ 371 (c)(1),
(2) Date: Nov. 2, 2017

(87) PCT Pub. No.: WO2016/207181
PCT Pub. Date: Dec. 29, 2016

(65) Prior Publication Data
US 2019/0155038 A1    May 23, 2019

(30) Foreign Application Priority Data

Jun. 22, 2015 (DE) .................. 10 2015 007 894
Jul. 20, 2015 (DE) .................. 10 2015 009 124

(51) Int. Cl.
*G02B 27/09* (2006.01)
*G02B 7/10* (2006.01)
(Continued)

(52) U.S. Cl.
CPC ......... *G02B 27/0955* (2013.01); *G02B 7/023* (2013.01); *G02B 7/10* (2013.01); *G02B 27/09* (2013.01); *G02B 26/10* (2013.01)

(58) Field of Classification Search
CPC .... G02B 27/0955; G02B 27/09; G02B 7/023; G02B 7/10; G02B 26/10
(Continued)

(56) References Cited

U.S. PATENT DOCUMENTS

| 6,714,564 B1 | 3/2004 | Meyers |
| 2010/0118283 A1 | 5/2010 | Aizawa et al. |
| 2017/0059836 A1* | 3/2017 | Takano ................ G02B 13/006 |

FOREIGN PATENT DOCUMENTS

| CN | 2748941 Y | 12/2005 |
| CN | 101211001 A | 7/2008 |

(Continued)

OTHER PUBLICATIONS

Chinese Office Action dated Jul. 2, 2019 in corresponding application 201680024082.0.

*Primary Examiner* — Collin X Beatty
(74) *Attorney, Agent, or Firm* — Muncy, Geissler, Olds & Lowe, P.C.

(57) ABSTRACT

The invention relates to a device (102) for optical beam expansion of an optical system having a guide tube (220), a first guide cylinder (222) having a first lens (226), wherein the first guide cylinder (202) is arranged within the guide tube (220) so as to be displaceable along the longitudinal axis of the guide tube (220), and a second guide cylinder (224) having a second lens (228), wherein the second guide cylinder (224) is arranged within the guide tube (220) so as to be displaceable along the longitudinal axis of the guide tube (220). A first displacement device is provided to displace the first guide cylinder (222) along the longitudinal axis (340) of the guide tube (220), and a second displace-
(Continued)

ment device is provided to displace the second guide cylinder (224) along the longitudinal axis of the guide tube (220).

17 Claims, 5 Drawing Sheets

(51) Int. Cl.
*G02B 7/02* (2006.01)
*G02B 26/10* (2006.01)

(58) Field of Classification Search
USPC .......................................................... 359/432
See application file for complete search history.

(56) References Cited

FOREIGN PATENT DOCUMENTS

| | | |
|---|---|---|
| CN | 201307182 Y | 9/2009 |
| CN | 201307183 Y | 9/2009 |
| CN | 201307183 Y | 9/2009 |
| CN | 101738730 A | 6/2010 |
| CN | 102328154 A | 1/2012 |
| CN | 203275776 U | 11/2013 |
| CN | 203519909 U | 4/2014 |
| DE | 10 2009 025 182 B4 | 1/2015 |
| DE | 20 2014 009 275 U1 | 4/2015 |
| JP | H10213777 A | 8/1998 |
| JP | 2000271775 A | 10/2000 |
| JP | 2003090980 A | 3/2003 |
| JP | 2004341057 A | 12/2004 |
| JP | 2008046213 A | 2/2008 |
| JP | 2010097177 A | 4/2010 |

\* cited by examiner

DEVICE FOR OPTICAL BEAM EXPANSION, OPTICAL SYSTEM, AND METHOD FOR SETTING A SPACING OF TWO LENSES OF A DEVICE FOR OPTICAL BEAM EXPANSION

This nonprovisional application is a National Stage of International Application No. PCT/EP2016/064345, which was filed on Jun. 22, 2016, and which claims priority to German Patent Application No. 10 2015 007 894.1, which was filed in Germany on Jun. 22, 2015 and German Patent Application No. 10 2015 009 124.7, which was filed in Germany on Jul. 20, 2015, and which are all herein incorporated by reference.

BACKGROUND OF THE INVENTION

Field of the Invention

The present invention relates to an apparatus for optical beam widening, an optical system, a method for setting a distance between two lens elements of an apparatus for optical beam widening, and to a method for producing an apparatus for optical beam widening.

Description of the Background Art

In the case of optical systems, particularly in the case of those with laser-based beam sources, the beam diameters must be adapted, i.e. enlarged or reduced, in the optical path. Since both the laser output diameter and the input diameter of the final optical system (e.g. F-theta lens) vary depending on the component, various magnifications are required in industrial use. An optical system which is able to realize various magnifications and diameters is referred to as variable beam expander. In order to compensate for manufacturing variations in the beam expander itself and in the surrounding optical system, the divergence of the beam path typically is separately adjustable on the beam expander.

DE 10 2009 025 182 B4 describes such an optical beam expander.

CN 102 328 154 A discloses an apparatus for optical beam widening, comprising two guide cylinders that are displaceable along an optical axis, each comprising a lens element and a displacement device. DE 20 2014 009 275 U1 discloses an apparatus for optical beam widening, comprising a guide tube and a guide cylinder that is displaceable along the longitudinal axis of the guide tube, said guide cylinder comprising a lens element and a displacement device.

SUMMARY OF THE INVENTION

Against this backdrop, the present invention presents an apparatus for optical beam widening, an optical system, a method for setting a distance between two lens elements of an apparatus for optical beam widening, and a method for producing an apparatus for optical beam widening according to the main claims. Advantageous configurations emerge from the respective dependent claims and the subsequent description.

The described approach affords the possibility of lens elements or compound lenses of a beam expander moving in an external cylinder. As a result of this, advantageously, the region in which lubricants, inter alia, are required lies far away from the lens element surfaces. According to an embodiment, the magnification can be set quickly, i.e. without a thread. According to an embodiment, the divergence can be set precisely, i.e. with a thread.

Advantageously, it is possible to realize quick, precise, stable and lockable beam widening with a long operational life by using the described approach.

An apparatus for optical beam widening for an optical system comprises the following features:

a guide tube;

a first guide cylinder comprising a first lens element, wherein the first guide cylinder is arranged such that it is displaceable along the longitudinal axis of the guide tube within the guide tube;

a second guide cylinder comprising a second lens element, wherein the second guide cylinder is arranged such that it is displaceable along the longitudinal axis of the guide tube within the guide tube;

a first displacement device for displacing the first guide cylinder along the longitudinal axis of the guide tube; and a second displacement device for displacing the second guide cylinder along the longitudinal axis of the guide tube.

The apparatus can also be referred to as a variable beam expander. The apparatus can be arranged in an optical path of an optical system and it is embodied to adapt a beam diameter of a beam, for example of a light beam. Here, the beam diameter can be increased or reduced. In addition to variable beam widening, the apparatus can be used for setting the divergence. The guide tube can have a cylindrical embodiment. The guide tube can surround an interior in which the guide cylinders are arranged. At least the first guide cylinder may be arranged completely within the guide tube. The first lens element can be rigidly connected to the first guide cylinder. The second lens element can be rigidly connected to the second guide cylinder. By using the displacement devices, the guide cylinders may carry out linear movements along the longitudinal axis of the guide tube and, as a consequence, the lens elements can be moved toward one another or away from one another. In this way, it is possible to modify the distance between the lens elements. The displacement devices may comprise a suitable mechanism for displacing the guide cylinders.

The guide tube may extend over an entire length of the first guide cylinder. As a consequence, the first guide cylinder may be completely received by the guide tube. Further, the guide tube can extend at least over a length of a first section of the second guide cylinder. According to an embodiment, the first section of the second guide cylinder extends over at least half of the total length of the second guide cylinder. Further, the guide tube may extend over an interstice arranged between the guide cylinders. In this way, high stability of the apparatus can be achieved.

The second displacement device can extend over at least a length of a second section of the second guide cylinder that adjoins the first section. The first section and the second section may comprise the entire length of the second guide cylinder. In this way, both guide cylinders may be completely arranged within the guide tube that is extended by the second displacement device.

The first displacement device may be embodied to displace the first guide cylinder in response to a first actuation force that acts on the first displacement device from outside of the guide tube. Correspondingly, the second displacement device can be embodied to displace the second guide cylinder in response to a second actuation force that acts on the second displacement device from outside of the guide tube. The actuation forces may be applied by an operator or an operating device. Here, and in the following text, embodied may be understood to mean that the corresponding device is suitably formed for carrying out the respectively specified function.

According to an embodiment, the first displacement device may comprise an actuation element and a pickup element. The actuation element, when driven by a first actuation force, can be embodied to carry out a linear movement along the longitudinal axis of the guide tube. Here, the linear movement can be effectuated by a component of the first actuation force that acts along the longitudinal axis of the guide tube. The pickup element can be embodied to transfer the linear movement of the actuation element for displacing the first guide cylinder to the first guide cylinder. Here, the linear movement of the actuation element can be transferred directly, i.e. without conversion, to the first guide cylinder. In this way, a movement of the first displacement device may equal a movement of the first guide cylinder. As a consequence, the first displacement device may be embodied as a simple slider.

The second displacement device, when driven by a second actuation force, can be embodied to carry out a rotational movement about the longitudinal axis of the guide tube. Here, the rotational movement can be effectuated by a component of the second actuation force that acts transversely to the longitudinal axis of the guide tube. The second displacement device may comprise a thread which engages with a counter thread of the second guide cylinder in order to convert the rotational movement of the second displacement device into a linear movement of the second guide cylinder so as to displace the second guide cylinder along the longitudinal axis of the guide tube. As a consequence, the second displacement device may be embodied as a simple displacement imparting thread.

The second displacement device may be arranged at one end of the guide tube and connected to the guide tube in a manner rotatable about the longitudinal axis of the guide tube. In this way, the second displacement device can be turned for displacing the second guide cylinder while the guide tube is at rest.

According to an embodiment, the apparatus can comprise a first anchoring device for anchoring a position of the first guide cylinder within the guide tube and additionally, or alternatively, a second anchoring device for anchoring a position of the second guide cylinder within the guide tube. The use of an anchoring device allows a lens element to be securely anchored in a current position after the displacement of the corresponding guide cylinder into said position.

By way of example, the first lens element may be embodied to adapt a beam diameter of a beam when the beam passes through the apparatus. As a consequence, the beam diameter can be increased or reduced by using the lens element. Additionally, or alternatively, the second lens element may be embodied to adapt a divergence of the beam when the beam passes through the apparatus. This facilitates variable beam widening and a variable divergence setting.

The first guide cylinder may comprise slide surfaces for guiding the first guide cylinder along the longitudinal axis of the guide tube within the guide tube. Together with the inner wall of the guide tube, the slide surfaces of the first guide cylinder may form a plain bearing. As a consequence, the apparatus may comprise a plain bearing for guiding the first guide cylinder within the guide tube. A plain bearing can facilitate a jerk-free displacement of the first guide cylinder. Here, it is possible to dispense with lubricants by way of a suitable material selection.

Accordingly, the second guide cylinder may comprise slide surfaces for guiding the second guide cylinder along the longitudinal axis of the guide tube within the guide tube. Together with the inner wall of the guide tube, the slide surfaces of the second guide cylinder may form a plain bearing. As a consequence, the apparatus may comprise a plain bearing for guiding the second guide cylinder along the longitudinal axis of the guide tube within the guide tube. A plain bearing can facilitate a jerk-free displacement of the second guide cylinder. Here, it is possible to dispense with lubricants by way of a suitable material selection.

Further, the apparatus may comprise an anti-twist device for twist-free guidance of the second guide cylinder along the longitudinal axis of the guide tube within the guide tube. In this way, a rotational movement of the second displacement device can be converted into a linear movement of the second guide cylinder.

According to an embodiment, the apparatus may comprise a third lens element. The third lens element may be arranged at one end of the guide tube. Here, the first lens element may be arranged between the third lens element and the second lens element. Here, the third lens element can be rigidly connected to the guide tube.

An optical system comprises the following features:
a beam source for emitting a beam;
an aforementioned apparatus for optical beam widening which is embodied to widen the beam and output the latter as a widened beam; and a deflection unit for deflecting the widened beam.

By way of example, a laser may be used as a beam source, and so the beam can be a laser beam. When passing the apparatus, the beam may first travel through the first lens element and subsequently through the second lens element.

A method for setting a distance between a first lens element and a second lens element of an aforementioned apparatus for optical beam widening comprises the following steps:
displacing the first guide cylinder in response to a first actuation force that acts on the first displacement device from outside of the guide tube; and
displacing the second guide cylinder in response to a second actuation force that acts on the second displacement device from outside of the guide tube.

The displacement steps can be carried out using the aforementioned displacement devices.

A method for producing an aforementioned apparatus for optical beam widening for an optical system comprises the following steps:
providing a guide tube;
arranging a first guide cylinder comprising a first lens element in a displaceable manner within the guide tube;
arranging a second guide cylinder comprising a second lens element in a displaceable manner within the guide tube;
anchoring a first displacement device for displacing the first guide cylinder along the longitudinal axis of the guide tube on the guide tube; and
anchoring a second displacement device for displacing the second guide cylinder along the longitudinal axis of the guide tube on the guide tube.

The displacement devices may be coupled to the guide cylinders during the anchoring steps.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the following description of advantageous exemplary embodiments of the present invention, the same or similar reference signs are used for the elements which are depicted in the various figures and have a similar effect, with a repeated description of these elements being dispensed with.

Figure 1:
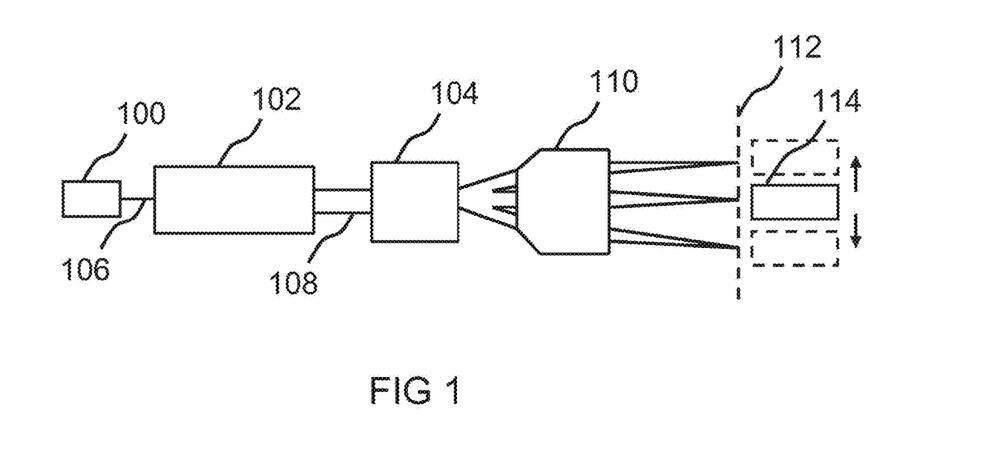
FIG. 1 shows a schematic illustration of an optical system according to an exemplary embodiment.

FIG. 1 shows a schematic illustration of an optical system according to an exemplary embodiment. The optical system comprises a beam source 100, an apparatus 102 for optical beam widening and a deflection unit 104. The beam source 100 is embodied as a laser in an exemplary manner, said laser being embodied to emit a laser beam 106. The laser beam 106 passes through the apparatus 102 and is widened in the process. The laser beam 108 that is widened under application of the apparatus 102 is deflected in different directions by the deflection unit 104 which, according to this exemplary embodiment, is embodied as a scanner.

According to this exemplary embodiment, the optical system further comprises an F-theta lens 110, which is embodied to guide the beams that are deflected by the deflection unit 104 onto an image plane 112. A sensor 112 that is displaceably arranged along the image plane 114 is arranged downstream of the image plane 112 in the beam direction.

The apparatus 102 facilitates variable widening of the laser beam 106. The variable setting necessitates the displacement of lens elements or compound lenses. When the magnification and/or the divergence is set, the beam direction (beam pointing) should change as little as possible.

A typical optical system has a beam source 100, beam expander 102, deflection unit (scanner) 104 and F theta 110. Often, these are also used when producing higher harmonics (second harmonic generation) since the intensity (power per unit area) can also be adapted with the beam diameter.

Here, the beam expander 102 is often exposed to high powers. These are, firstly, femtosecond (fs) pulses with a low average power but extreme pulse peak power and the nanosecond pulses or continuous wave lasers with extreme average power in the kilowatt range. Both fields of use require freedom from contamination to the highest degree.

Figure 2:
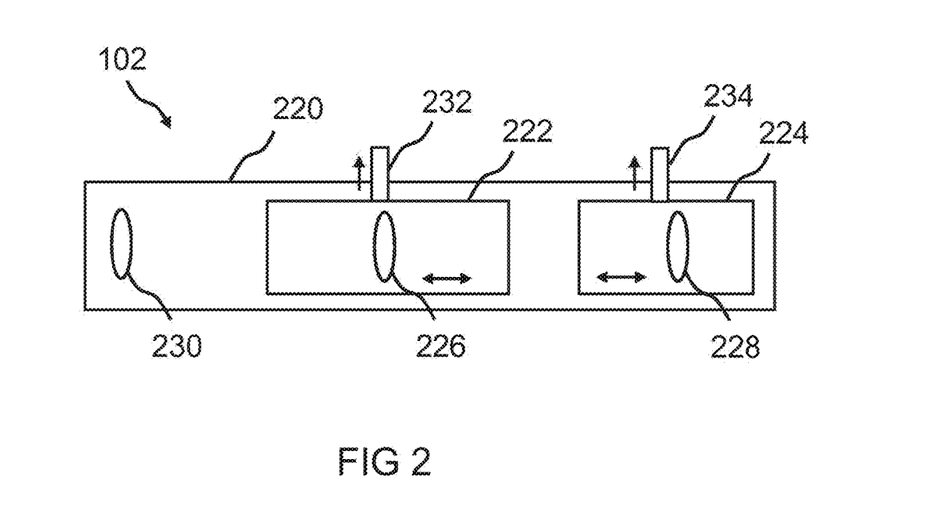
FIG. 2 shows a schematic illustration of an apparatus for optical beam widening for an optical system according to an exemplary embodiment.

FIG. 2 shows a schematic illustration of an apparatus 102 for optical beam widening for an optical system according to an exemplary embodiment. By way of example, the apparatus 102 may be used in conjunction with the system described on the basis of FIG. 1.

The apparatus 102 comprises a guide tube 220 as well as a first guide cylinder 222 and a second guide cylinder 224. The guide cylinders 222, 224 are arranged within the guide tube 220. According to this exemplary embodiment, the guide cylinders 222, 224 are completely received by the guide tube 220. The guide cylinders 222, 224 are displaceably arranged within the guide tube 220. The guide cylinders 222, 224 can be moved independently of one another along a longitudinal axis of the guide tube 220, as indicated by the two double-headed arrows. The guide cylinders 222, 224 are arranged at a distance from one another.

The first guide cylinder 222 carries a first lens element 226. The first lens element 226 is rigidly connected to the first guide cylinder 222 according to an exemplary embodiment. Displacing the first guide cylinder 222 effectuates a displacement of the first lens element 226 within the guide tube 220. By way of the displacement, the first lens element is displaced either in the direction of a first end of the guide tube 220, which is depicted to the left in this case, or in the direction of a second end of the guide tube 220, which is depicted to the right in this case.

The second guide cylinder 224 carries a second lens element 228. The second lens element 228 is rigidly connected to the second guide cylinder 224 according to an exemplary embodiment. Displacing the second guide cylinder 224 effectuates a displacement of the second lens element 228 within the guide tube 220. By way of the displacement, the second lens element is displaced either in the direction of the first end or in the direction of the second end of the guide tube 220.

For the purposes of displacing the guide cylinders 222, 224, provision is made of two displacement devices which are embodied or formed to displace the guide cylinders 222, 224 in response to actuation forces that act on the displacement devices from outside of the guide tube 220. According to an exemplary embodiment, the guide cylinders 222, 224 carry out pure linear movements without a rotational component during the displacement.

According to an exemplary embodiment, the apparatus 102 comprises a further lens element 230. The further lens element 230 is arranged in a stationary manner within the guide tube 220. According to this exemplary embodiment, the further lens element 230 is arranged on the side of the first end and the second lens element 228 is arranged on the side of the second end of the guide tube 220. The first lens element 226 is arranged between the further lens element 230 and the second lens element 228.

According to an exemplary embodiment, a beam to be widened when using the apparatus 102 initially passes through the further lens element 230 after entry into the apparatus 102, said beam then passes through the first lens element 226 and, finally, the second lens element 228 before the beam leaves the apparatus 102.

According to an exemplary embodiment, the apparatus comprises two anchoring devices 232, 234 for anchoring the guide cylinders 222, 224 within the guide tube 220. According to this exemplary embodiment, the anchoring devices 232, 234 are embodied as pins or set screws which are guided through passage openings in a wall of the guide tube 220 and which are coupled to the guide cylinders 222, 224. As indicated by arrows, the anchoring devices 232, 234 can be moved radially to the outside in relation to the longitudinal axis of the guide tube 220, for example by pulling a pin or by loosening a screw, in order to release the guide cylinders 222, 224.

According to an exemplary embodiment, the lens elements 226, 228 move in a continuous tube 220 and are guided thereby. Advantageously, no lever effect occurs in the process and there is no addition of individual tolerances. The guide tube 220 and tubes used for the guide cylinders 222, 224 are easily producible with narrow tolerances. The lens elements 226, 228 can be anchored by set screws 232, 234. Advantageously, this provides an extremely high reproducibility for setting the position of the lens elements 226, 228 and high stability in relation to shocks and vibrations. Moreover, there is a decoupling of an adjustment mechanism and centering.

According to the described approach, it is not necessary to hold lens elements 226, 228 or compound lenses in cylinders, each of which has an external thread at the left or right end, or at both ends, for the center pieces and which are screwed in an external cylinder with inner threads (to the left and right) in order to be able to set the distances between the mounting cylinders, i.e. the lens elements.

Therefore, by way of the described approach, the apparatus 102 can be produced in a cost-effective manner and with a high stability of the beam direction before and after, or during, the adjustment. The construction principle renders it possible to avoid thread compounds and greases precipitating on the lens elements 226, 228, 230. Further, the described solution is lockable.

Figure 3:
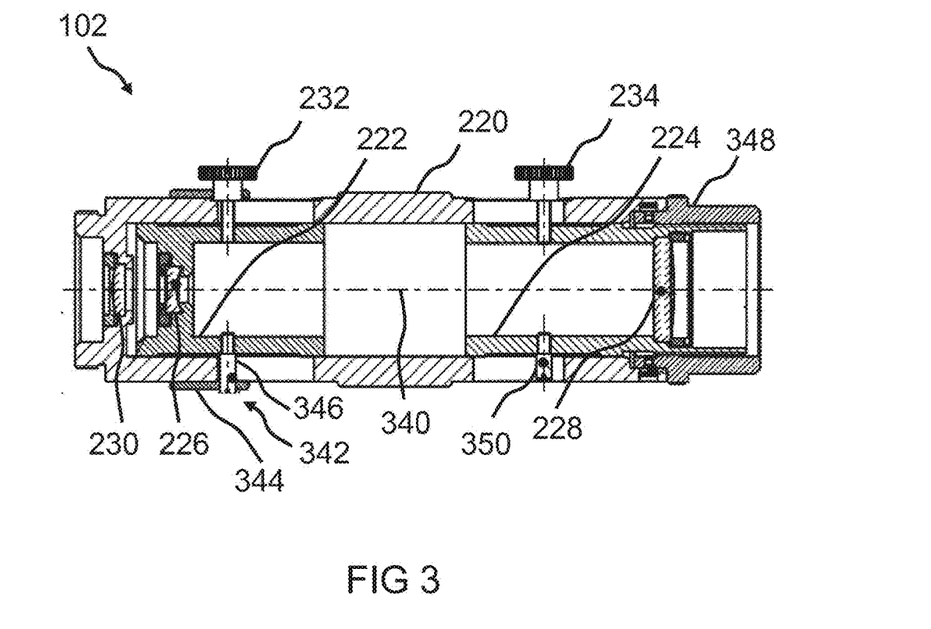
FIG. 3 shows an illustration of an apparatus for optical beam widening for an optical system according to an exemplary embodiment.

FIG. 3 shows an illustration of an apparatus 102 for optical beam widening for an optical system according to an exemplary embodiment. By way of example, the apparatus 102 may be an embodiment of the apparatus described on the basis of FIG. 2.

The apparatus 102 comprises a guide tube 220. The guide tube has a round cross section. A first guide cylinder 222 comprising a first lens element 226 is arranged completely within the guide tube 220. A second guide cylinder 224 comprising a second lens element 228 is largely arranged within the guide tube 220. The guide cylinders 222, 224 are mounted in a manner displaceable along the longitudinal axis 340 of the guide tube 220 within the guide tube 220. A maximum external diameter of the guide cylinders 222, 224 is adapted to the internal diameter of the guide tube 220. According to an exemplary embodiment, the diameters are selected in such a way that the guide cylinders 222, 224 and the guide tube 220 are in contact over the entire circumference in the region of slide surfaces of the guide cylinders 222, 224 and the guide cylinders 222, 224 can slide within the guide tube 220. The guide cylinders 222, 224 each have a passage opening along the longitudinal axis 340, in which one of the lens elements 226, 228 is arranged in each case. Instead of one lens element 226, 228 in each case, at least one of the guide cylinders 222, 224 may also carry two or more lens elements, i.e. a compound lens.

As anchoring devices, the apparatus 102 comprises a first locking knurled screw 232 for anchoring the first guide cylinder 222 in relation to the guide tube 220 and a second locking knurled screw 234 for anchoring the second guide cylinder 224 in relation to the guide tube 220. The heads of the locking knurled screws 232, 234 are arranged outside of the guide tube 220—in a manner actuatable by an operator. The pins of the locking knurled screws 232, 234 are guided through slots that extend along the longitudinal axis 340 in a wall of the guide tube 220 and inserted in recesses in walls of the respective guide cylinders 222, 224.

According to an exemplary embodiment, the guide tube 220 has a wall with a passage opening on which a third lens elements 230 is arranged at a first end, which is depicted to the left in this case.

The apparatus 102 comprises a first displacement device 342 for displacing the first guide cylinder 222 along the longitudinal axis 340 of the guide tube 102. The first displacement device 342 is directly, e.g. rigidly, coupled to the first guide cylinder 222 such that a movement of the first displacement device 342 corresponds to a movement of the first guide cylinder 222.

According to an exemplary embodiment, the first displacement device 342 comprises an actuation element 344 and a pickup element 346. The actuation element 344 is arranged on an outer side of the guide tube 220 and can be displaced along the outer side of the guide tube 220 along the longitudinal axis 340 by an operator by way of the application of an actuation force. By way of example, the actuation element 344 is embodied as a ring that encloses the guide tube 220 or as a ring segment. The pickup element 346 is coupled to the actuation element 344 and the first guide cylinder 222 in order to transfer a movement of the pickup element 346 to the first guide cylinder 222. According to an exemplary embodiment, the pickup element 346 is embodied as a pin which is guided in the wall of the guide tube 220 through a further slot that extends along the longitudinal axis 340 and which is introduced into a further recess in the wall of the first guide cylinder 222.

The apparatus 102 comprises a second displacement device 348 for displacing the second guide cylinder 224 along the longitudinal axis 340 of the guide tube 102. The second displacement device 348 is formed as a ring and arranged at a second end—depicted to the right in this case—of the guide tube 220. The second displacement device 348 constitutes an extension of the guide tube 220 beyond the second end of the guide tube 220. End sections of the guide tube 220 and of the second displacement device 348 that face one another overlap and are rotatably connected to one another by way of a bearing. The second displacement device 348 is coupled to the second guide cylinder 224 by way of a threaded connection. To this end, a female thread of the second displacement device 348 engages in a male thread of the second guide cylinder 224. The male thread of the second guide cylinder 224 is arranged on a side facing the second displacement device 348 of the second guide cylinder 224. The second guide cylinder 224 is coupled to an anti-twist device 350 which prevents twisting of the second guide cylinder 224 within the guide tube 220. According to this exemplary embodiment, the anti-twist device 350 comprises a pin which is guided through a further slot that extends along the longitudinal axis 340 in the wall of the guide tube 220 and which is introduced into a further recess in the wall of the second guide cylinder 224. The second displacement device 348 can be twisted in relation to the stationary guide tube 220 by an operator. Since the second guide cylinder 224 cannot co-rotate with the second displacement device 348 on account of the anti-twist device 350, the threaded connection between the second displacement device 348 and the second guide cylinder 224 effectuates a conversion of the rotational movement of the second displacement device 348 into a linear movement of the second guide cylinder 224.

According to this exemplary embodiment, the first guide cylinder 222 is completely arranged within the guide tube 220. The second guide cylinder 222 is completely arranged within a space enclosed by the guide tube 220 and the second displacement device 348. Here, the guide cylinders 222, 224 are mounted with anti-twist protection within the guide tube 220. According to an exemplary embodiment, the guide tube 220 has an integral embodiment. The guide tube 220 extends continuously over the entire length of the first guide cylinder 222, an interstice between the first guide cylinder 222 and the second guide cylinder 224, and over a section, e.g. at least half the length, of the second guide cylinder 224. According to an exemplary embodiment, the guide tube 220 is embodied without female thread for displacing the guide cylinders 222, 224.

According to the shown exemplary embodiment, the first lens element 226 is arranged displaced toward a side of the first guide cylinder 222 that faces the first end of the guide tube 220. The second lens element 228 is arranged displaced toward a side of the second guide cylinder 224 that faces the second displacement device 348. According to this exemplary embodiment, the second lens element 228 is arranged in a transition region between an outer surface that is formed as a slide surface and an outer surface of the second guide cylinder 224 that is formed as a male thread.

According to an exemplary embodiment, the first lens element 226 is formed for setting the diameter of a beam that is incident into the apparatus 102 from the first end of the apparatus 102 and the second lens element 228 is formed for adapting the divergence of the beam.

As a consequence, the diameter of the beam can be set by displacing the first guide cylinder 222 using the first displacement device 342. The divergence can be set by displacing the second guide cylinder 224 using the second displacement device 348.

Advantageously, the movement of the lens elements 226, 228 or of the compound lenses in the cylinder 220 leads to high directional stability during the adjustment process in the case of the described approach. Since the thread for setting the divergence lies far away from the lens surfaces and the magnification setting makes do without a thread, degassings can almost no longer precipitate on the lens surfaces, leading to a long service life.

Despite the high stability, the production costs are very low on account of the selected principle.

The lockability leads to a high long-term stability, even in the case of rough surrounding conditions.

The lens elements 226, 228 run in a protected manner in the mounting cylinders 222, 224 within a surrounding tube which, according to this exemplary embodiment, is formed by an interior space of the guide tube 220.

It is possible to set the divergence by rotating a ring which, for example, may be formed by a circumferential web which protrudes beyond the exposed outer surface of the second displacement device 348. In so doing, the mounting cylinder 224 is pushed by way of a pickup.

According to the shown exemplary embodiment, the second displacement device 348 is embodied as a displacement imparting thread. The lens elements 226, 228 sit in guide cylinders 222, 224. The guide cylinders 222, 224 sit in the tube 220. One of the lens elements 226, 228—the first lens element 226 according to this exemplary embodiment—is pushed directly from the outside and the other lens element 226, 228—the second lens element 228 according to this exemplary embodiment—is pushed by the second displacement device 348 that is embodied as an attachment with a thread. As a result, a high accuracy and reproducibility are facilitated.

Figure 4:
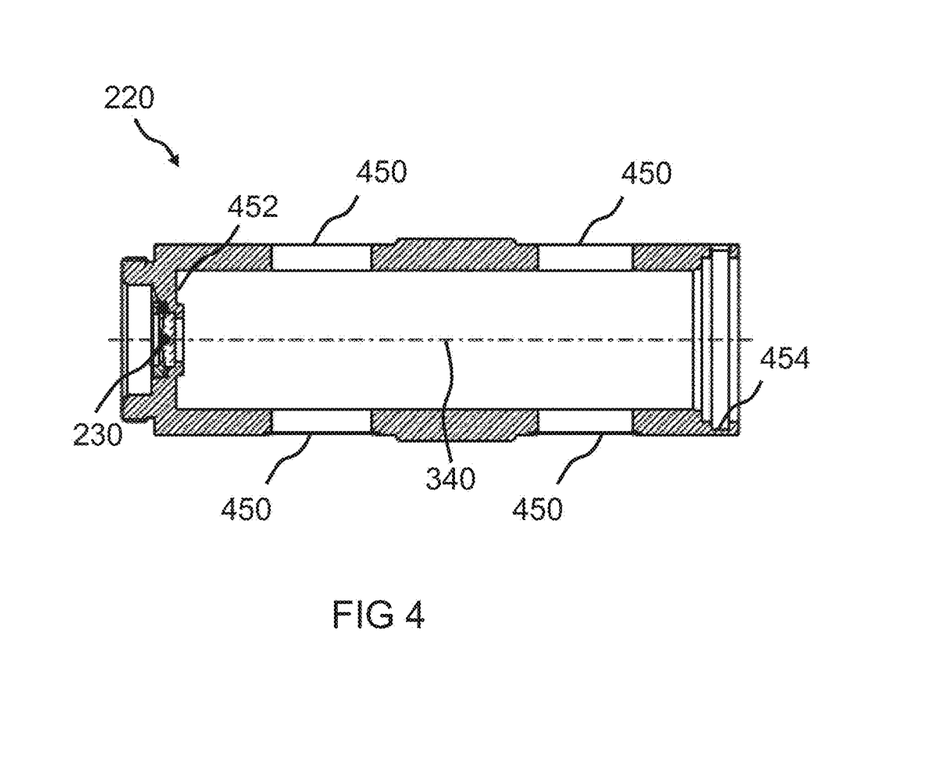
FIG. 4 shows an illustration of a guide tube according to an exemplary embodiment.

FIG. 4 shows a cross-sectional illustration of a guide tube 220 according to an exemplary embodiment. Here, this may be the guide tube that is described on the basis of FIG. 3. The guide tube comprises a circumferential wall which encloses a circular cylindrical cavity in which the guide cylinders shown on the basis of FIGS. 5 and 6 can be arranged. Slots 450 that are formed as through holes are arranged in the circumferential wall. The slots 450 can guide the anchoring devices that are described on the basis of FIG. 3, as well as the displacement device that is assigned to the first guide cylinder and the anti-twist device that is assigned to the second guide cylinder.

At a first end of the guide tube 220, the circular cylindrical cavity is closed by an intermediate wall 452. The intermediate wall 452 comprises a centrally arranged passage opening, in which a lens element 230 is arranged. At a second end that lies opposite the first end, the circumferential wall of the guide tube 220 comprises, at the inner side thereof, at least one circumferential groove 454 for bearing the second displacement device which is shown on the basis of FIG. 7.

Figure 5:
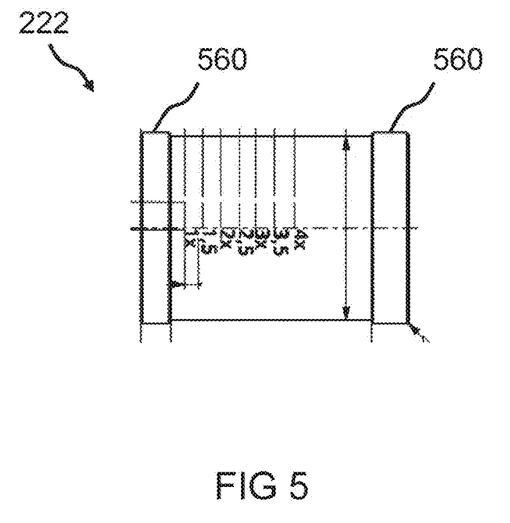
FIG. 5 shows an illustration of a first guide cylinder according to an exemplary embodiment.

FIG. 5 shows a side view of a first guide cylinder 222 according to an exemplary embodiment. Here, this may be the first guide cylinder described on the basis of FIG. 3. The first guide cylinder 222 has a circular cylindrical outer surface which has circumferential elevations at both ends of the first guide cylinder 222. Outer surfaces of the elevations are formed as slide surfaces 560, along which the first guide cylinder 222 can slide along the inner wall of a guide tube when the first guide cylinder 222 is inserted into the guide tube. Accordingly, the slide surfaces 560 and the corresponding inner wall of the guide tube can be formed as flat surfaces such that the second guide cylinder 224 can slide on the inner wall of the guide tube along the longitudinal axis of the guide tube.

According to an exemplary embodiment, a scale is plotted on the circular cylindrical outer surface, which scale may be identifiable by an operator through a window in the guide tube.

Figure 6:
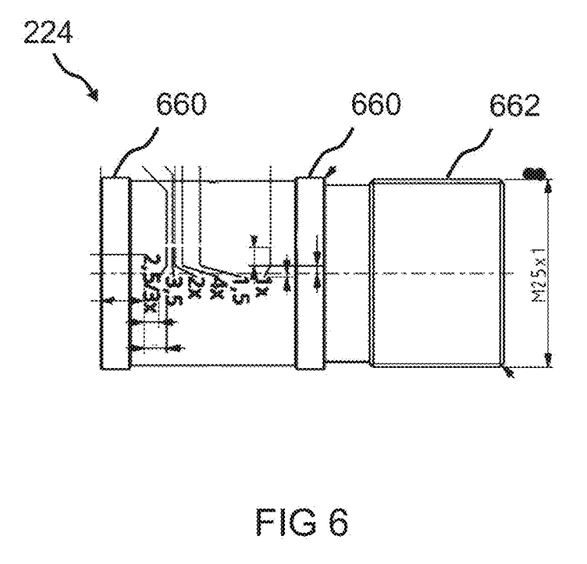
FIG. 6 shows an illustration of a second guide cylinder according to an exemplary embodiment.

FIG. 6 shows a side view of a second guide cylinder 224 according to an exemplary embodiment. Here, this may be the second guide cylinder described on the basis of FIG. 3. The second guide cylinder 224 has a slide section and a threaded section.

The slide section comprises a circular cylindrical outer surface which is delimited at both ends by circumferential elevations. Outer surfaces of the elevations are embodied as slide surfaces 660, along which the second guide cylinder 220 can slide along the inner wall of a guide tube when the second guide cylinder 224 is inserted into the guide tube. Accordingly, the slide surfaces 660 and the corresponding inner wall of the guide tube may be formed as flat surfaces such that the second guide cylinder 224 can slide on the inner wall of the guide tube along the longitudinal axis of the guide tube.

According to an exemplary embodiment, a scale is plotted on the circular cylindrical outer surface of the slide section, which scale may be identifiable by an operator through a window in the guide tube.

The threaded section comprises a male thread 662. A second displacement device, as shown e.g. in FIG. 7, may be screwed onto the male thread 662.

The slide section and the threaded section are spaced apart from one another by a circular cylindrical intermediate section.

Figure 7:
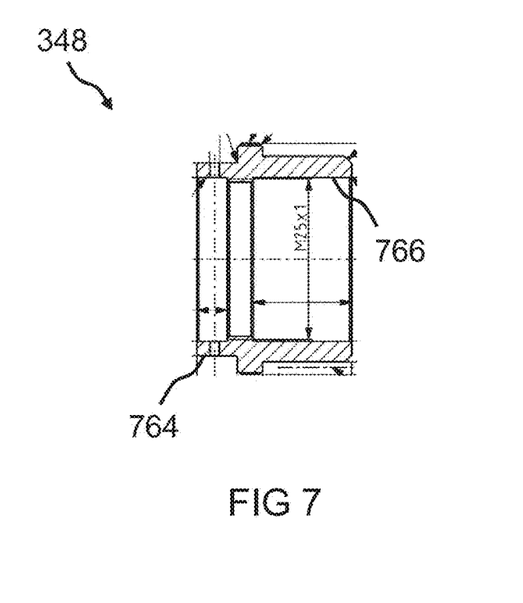
FIG. 7 shows an illustration of a second displacement device according to an exemplary embodiment.

FIG. 7 shows a cross-sectional illustration of a second displacement device 348 according to an exemplary embodiment. Here, this may be the second displacement device that is described on the basis of FIG. 3. The second displacement device 348 comprises a bearing section and a threaded section.

The bearing section comprises a wall 764 with a circular-ring-shaped cross section. The wall 764 can be inserted into a guide tube. The wall 764 has two passage openings, into which e.g. screws may be inserted, the heads of which can be guided by a groove of the guide tube such that the second displacement device 348 is rotatably connected to the guide tube.

The threaded section comprises a wall with an inner bearing 766, which is embodied as a counter bearing for an outer bearing of a second guide cylinder.

A circumferential elevation is arranged between the bearing section and the threaded section, said elevation being arranged outside of the guide tube when the second displacement device 348 is fastened to the guide tube. By way of example, the elevation can be used by an operator for twisting the second displacement device 348 in relation to the guide tube by the application of an actuation force.

Figure 8:
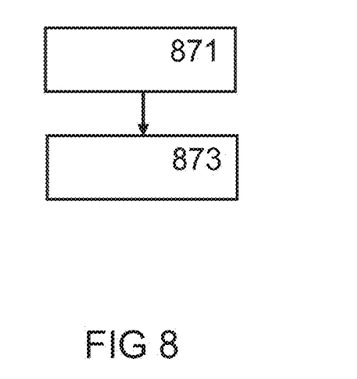
FIG. 8 shows a flowchart of a method for setting a distance between a first lens element and a second lens element of an apparatus for optical beam widening according to an exemplary embodiment.

FIG. 8 shows a flowchart of a method for setting a distance between a first lens element and a second lens element of an apparatus for optical beam widening according to an exemplary embodiment. The apparatus may be the apparatus described on the basis of FIG. 3.

In order to displace the first lens element to a desired position, a first guide cylinder, on which the first lens element is arranged, is displaced in a step 871. Here, the first guide cylinder is displaced in response to a first actuation force that acts on a first displacement device from outside of a guide tube.

In order to displace the second lens element to a desired position, a second guide cylinder, on which the second lens element is arranged, is displaced in a step 873. Here, the second guide cylinder is displaced in response to a second actuation force that acts on a second displacement device from outside of the guide tube.

Steps 871, 873 can be carried out in any order and repeatedly. Moreover, it is also possible that only one of the steps 871, 873 is carried out.

Figure 9:
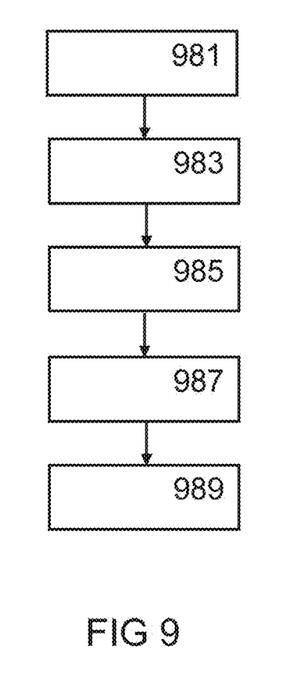
FIG. 9 shows a flowchart of a method for producing an apparatus for optical beam widening according to an exemplary embodiment.

FIG. 9 shows a flowchart of a method for producing an apparatus for optical beam widening in accordance with an exemplary embodiment. The apparatus may be the apparatus described on the basis of FIG. 3.

A guide tube is provided in a step 981. A first guide cylinder comprising a first lens element is introduced into the guide tube and displaceably arranged within the guide tube in a step 983. A second guide cylinder comprising a second lens element is introduced into the guide tube and displaceably arranged within the guide tube in a step 985. A first displacement device is coupled to the first guide cylinder and the guide tube in a step 987 in order to be able to displace the first guide cylinder within the guide tube. A second displacement device is coupled to the second guide cylinder and the guide tube in a step 989 in order to be able to displace the second guide cylinder within the guide tube.

Figure 10:
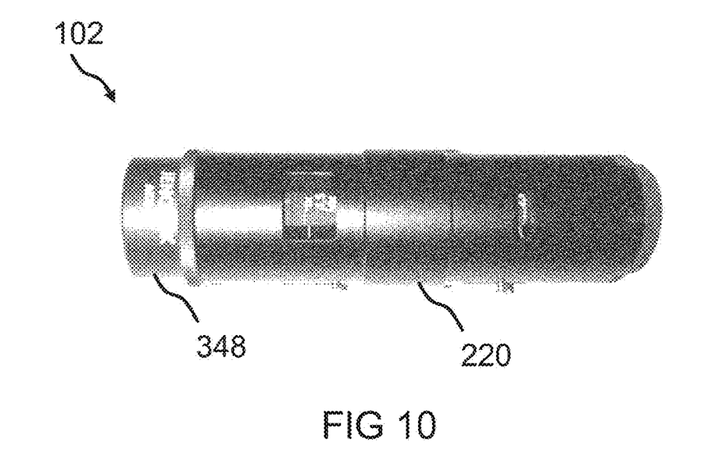
FIG. 10 shows an illustration of an apparatus for optical beam widening for an optical system according to an exemplary embodiment.

FIG. 10 shows an illustration of an apparatus 102 for optical beam widening for an optical system according to an exemplary embodiment.

If an exemplary embodiment comprises an "and/or" link between a first feature and a second feature, this should be read in such a way that the exemplary embodiment, according to an embodiment, comprises both the first feature and the second feature and, according to a further embodiment, comprises either only the first feature or only the second feature.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for optical beam widening for an optical system, the apparatus comprising:
a guide tube;
a first guide cylinder comprising a first lens element, wherein the first guide cylinder is arranged such that it is displaceable along the longitudinal axis of the guide tube within the guide tube;
a second guide cylinder comprising a second lens element, wherein the second guide cylinder is arranged such that it is displaceable along the longitudinal axis of the guide tube within the guide tube;
a first displacement device for displacing the first guide cylinder along the longitudinal axis of the guide tube, at least a portion of the first displacement device extending through an outer wall of the guide tube from the first guide cylinder, the first displacement device moving parallel to the longitudinal axis; and
a second displacement device for displacing the second guide cylinder along the longitudinal axis of the guide tube.

2. The apparatus as claimed in claim 1, wherein the guide tube extends over an entire length of the first guide cylinder and at least over a length of a first section of the second guide cylinder.

3. The apparatus as claimed in claim 1, wherein the first displacement device is embodied to displace the first guide cylinder in response to a first actuation force that acts on the first displacement device from outside of the guide tube and/or wherein the second displacement device is embodied to displace the second guide cylinder in response to a second actuation force that acts on the second displacement device from outside of the guide tube.

4. The apparatus as claimed in claim 1, wherein the first displacement device comprises an actuation element and a pickup element, wherein the actuation element, when driven by a first actuation force, is embodied to carry out a linear movement along the longitudinal axis of the guide tube and wherein the pickup element is embodied to transfer the linear movement of the actuation element onto the first guide cylinder for displacing the first guide cylinder.

5. The apparatus as claimed in claim 1, wherein the second displacement device, when driven by a second actuation force, is embodied to carry out a rotational movement about the longitudinal axis of the guide tube and wherein the second displacement device comprises a thread which is engaged with a counter thread of the second guide cylinder in order to convert the rotational movement of the second displacement device into a linear movement of the second guide cylinder so as to displace the second guide cylinder along the longitudinal axis of the guide tube.

6. The apparatus as claimed in claim 1, wherein the second displacement device is arranged at one end of the guide tube and connected to the guide tube in a manner rotatable about the longitudinal axis of the guide tube.

7. The apparatus as claimed in claim 1, comprising a first anchoring device for anchoring a position of the first guide cylinder within the guide tube and/or comprising a second anchoring device for anchoring a position of the second guide cylinder within the guide tube.

8. The apparatus as claimed in claim 1, wherein the first lens element is embodied to adapt a beam diameter of a beam when the beam passes through the apparatus and/or wherein the second lens element is embodied to adapt a divergence of the beam when the beam passes through the apparatus.

9. The apparatus as claimed in claim 1, wherein the first guide cylinder comprises slide surfaces for guiding the first guide cylinder along the longitudinal axis of the guide tube within the guide tube and/or the second guide cylinder comprises slide surfaces for guiding the second guide cylinder along the longitudinal axis of the guide tube within the guide tube and/or comprises an anti-twist device for guiding the second guide cylinder along the longitudinal axis of the guide tube within the guide tube without twist.

10. The apparatus as claimed in claim 1, comprising a third lens element which is arranged at one end of the guide tube, wherein the first lens element is arranged between the third lens element and the second lens element.

11. An optical system, comprising the following features:
a beam source for emitting a beam;
an apparatus for optical beam widening as claimed in claim 1 configured to widen the beam and output a widened beam; and
a deflection unit for deflecting the widened beam.

12. A method for setting a distance between a first lens element and a second lens element of an apparatus for optical beam widening as claimed in claim 1, the method comprising:
displacing the first guide cylinder in response to a first actuation force that acts on the first displacement device from outside of the guide tube, the first actuation force acting on the portion of the first displacement device extending through the outer wall of the guide tube from the first guide cylinder; and
displacing the second guide cylinder in response to a second actuation force that acts on the second displacement device from outside of the guide tube.

13. The apparatus as claimed in claim 1, wherein the second displacement device moves parallel to the longitudinal axis.

14. The apparatus as claimed in claim 1, wherein the second guide cylinder comprises slide surfaces for guiding the second guide cylinder along the longitudinal axis of the guide tube within the guide tube.

15. The apparatus as claimed in claim 1, wherein the second guide cylinder comprises an anti-twist device for guiding the second guide cylinder along the longitudinal axis of the guide tube within the guide tube without twist.

16. A method for producing an apparatus for optical beam widening for an optical system, the method comprising:
providing a guide tube;
arranging a first guide cylinder comprising a first lens element in a displaceable manner within the guide tube;
arranging a second guide cylinder comprising a second lens element in a displaceable manner within the guide tube;
anchoring a first displacement device for displacing the first guide cylinder along the longitudinal axis of the guide tube on the guide tube, at least a portion of the first displacement device extending through an outer wall of the guide tube from the first guide cylinder, the first displacement device moving parallel to the longitudinal axis; and
anchoring a second displacement device for displacing the second guide cylinder along the longitudinal axis of the guide tube on the guide tube.

17. The method as claimed in claim 16, wherein the first displacement device anchors to the outer wall of the guide tube.

* * * * *